No. 847,663. PATENTED MAR. 19, 1907.
T. W. HEERMANS.
SPEED CONTROLLING DEVICE FOR ELECTRIC MOTORS.
APPLICATION FILED NOV. 17, 1906.
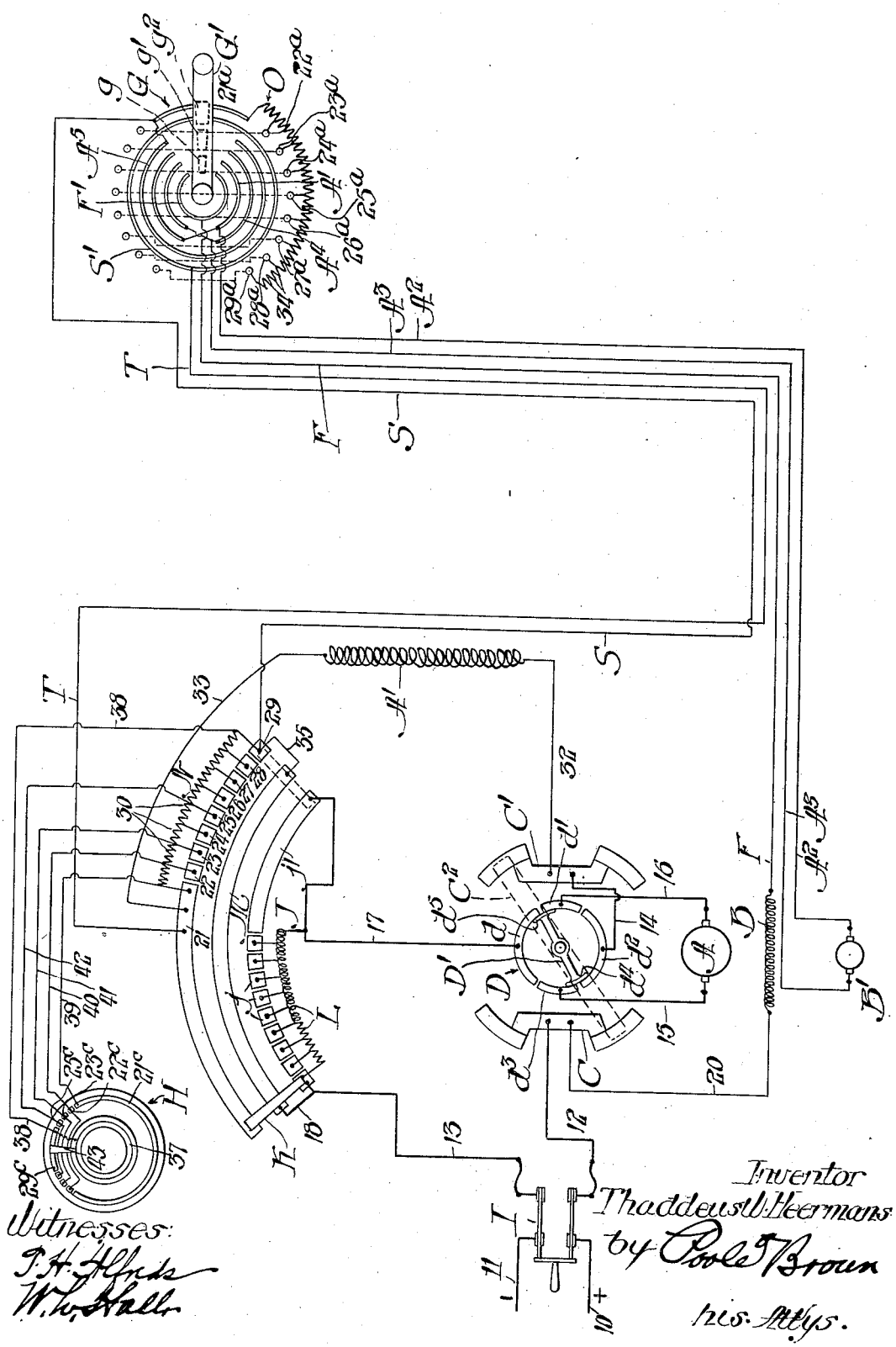
Witnesses:
Inventor
Thaddeus W. Heermans
by Poole & Brown
his Attys.

UNITED STATES PATENT OFFICE.

THADDEUS W. HEERMANS, OF CHICAGO, ILLINOIS.

SPEED-CONTROLLING DEVICE FOR ELECTRIC MOTORS.

No. 847,663.  Specification of Letters Patent.  Patented March 19, 1907.

Application filed November 17, 1906. Serial No. 343,880.

*To all whom it may concern:*

Be it known that I, THADDEUS W. HEERMANS, a citizen of the United States, of Chicago, in the county of Cook and State of Illinois, have invented certain new and useful Improvements in Speed-Controlling Devices for Electric Motors; and I do hereby declare that the following is a full, clear, and exact description thereof, reference being had to the accompanying drawings, and to the letters of reference marked thereon, which form a part of this specification.

This invention relates to improvements in speed-controlling apparatus for electric motors designed to control the speed of the motor from any distance or from a moving platform, such as the car of an elevator, through any number of steps within the range of the regulating-winding of the motor.

Among the objects of my invention is to provide an electric-motor speed-controlling apparatus which is so constructed and arranged that the speed of the motor and of the part driven thereby may at all times be controlled in closely-graduated steps through the manually-operated controlling-arm and an automatic speed-accelerating rheostat located at the motor, thereby avoiding injury to the motor-windings and preventing abrupt movement of the parts driven by the motor when starting and stopping.

A further object of the invention is to provide improved automatic means for gradually slowing down the elevator-car or other driven part at the terminals of its travel regardless of whether or not the controller at the controlling-station has been properly set to stop the car.

Another and important object of the invention is to simplify the wiring connections between the controller-station and the motor.

My improvements are especially applicable for use in connection with electric engines for driving passenger and other elevators and is herein shown as applied to such a use. Said improvements may, however, be applied to motors for driving other movable platforms and the like.

For a complete disclosure of my invention I have herein shown the same as adapted to the type of electric elevator-engines and controlling equipment therefor shown and described in the prior United States Letters Patent granted April 4, 1899, to myself and Whichello, No. 622,430. It will be understood, however, that my improvements are applicable to other forms of elevator-engines, and the invention is not restricted by the disclosure herein except as made the subject of specific claims.

In the illustrated application of my invention a motor is employed having a strong shunt-field, wherein the field is weakened and the speed of the motor increased by the introduction of the number of steps of resistance desired to produce the various increments of speed within the limits of the motor-winding.

My improved controlling device is characterized by the use of two rheostats connected in parallel in the shunt-field or other controlling circuit of the motor, one rheostat located at the motor and operating in connection with the regular automatic starting and accelerating controller and the other located at the controlling-station and operated by the attendant or conductor through a switch having points corresponding in number to the number of speeds required. The arms of the two rheostats thus connected in parallel are so set that when in their initial positions the resistance is cut out or short-circuited and the field is at its greatest strength and passing the maximum current. The parts are so arranged that the movement of the automatic starting rheostat-arm to its final or running position will not in itself remove the short circuit around the resistance, as such short circuit is still maintained by the rheostat-arm at the controlling-station. Moreover, the relation of the rheostats is such that the movement of the controlling rheostat-arm will not accelerate the movement of the motor without movement of the automatic rheostat-arm. The two rheostat-arms are therefore independent, while the rheostat-arm at the controlling-station always predetermines or introduces any amount of rheostat resistance required, and the automatic rheostat-arm determines only the rapidity of acceleration up to the speed which may be set by the operator, and this speed may be varied at will by him through the controlling rheostat-arm. Inasmuch as the shunt-circuit of the type of motor shown through either of the parallel rheostats is the sole means of maintaining speed regulation and inasmuch as the rheostat at the controlling-station governs the various steps and is designed to be set at the various steps arranged, it will be readily seen that only two conducting-wires are required between the motor and controlling-station. One of these wires may be utilized as the terminal wire for the magnetically-operated reversing-switch which is illustrated in the accompanying diagram and shown in detail in the prior patents above referred to.

The drawing shows a complete diagrammatic outlay of the several motor and motor-controlling circuits embodying my invention.

As shown in said drawing, A designates the armature, and A' the shunt field-coils, of the main motor.

B designates the field-coils, and B' the armature, of what is hereinafter termed a "motor-magnet," or a magnet designed to make and break the main-motor circuit and to reverse the motor.

C and C' designate contacts which are bridged to close the main-motor circuit through the medium of the switch-arm $C^2$.

D designates as a whole an automatic reversing-switch which, together with the make-and-break switch, is controlled by the motor-magnet. Said automatic reversing-switch comprises the stationary contact-plates $d\ d'\ d^2\ d^3$, disposed concentrically about an axis, and a switch-arm D', swinging on said axis and carrying shoes $d^4$ and $d^5$, adapted to bridge between the plates and complete the circuit of the main-motor armature, as will hereinafter be described. The said switch-arms $C^2$ and D, swing about a common axis and are designed to be controlled by the motor-magnet in the same general manner as illustrated in the prior patent, No. 622,430, hereinabove referred to.

G designates as a whole the manually-operable controller located at the controller-station, as in an elevator-car.

H designates as a whole a slow-down device, that is adapted to be operated at the terminals of travel of the elevator to slow down the car in case the controller at the controller-station be not properly operated for this purpose.

10 and 11 designate the positive and negative feed-wires, respectively, connected by the switch I with conductors 12 and 13.

The main-motor armature-circuit is completed from conductor 12 through switch-terminal C, switch-arm $C^2$, terminal C', conductor 14, switch-plate $d^2$, shoe $d^4$, switch-plate $d^3$, conductor 15, armature A, conductor 16, switch-plate $d'$, shoe $d^5$, switch-plate $d$, and conductor 17 to the terminal plate of a series of stationary contact-plates J, the other end of which series is connected by return-conductor 13 to the return side of switch I. The stationary contact-plates are insulated from each other, and the plates $j$ at the end of the series which is connected with the return-wire 13 are short and closely spaced, while the plate $j'$ is elongated.

K designates a moving arm or contact which wipes over the contacts $j\ j'$. The said contacts $j$ constitute the terminals of a series of coils L in series with the armature A through conductor 17. Said coils may comprise auxiliary windings arranged in series or other suitable resistance or a combination of both.

M designates a stationary contact-plate arranged parallel to the series of plates J and in series with the terminal T of the shunt field-circuit and the return side of the switch I through the conductor 13 and conductor 18. The said contact or arm K moves in wiping engagement with the contact-plate M and the series of plates J and constitutes a return connection between said plates at a time when the arm is advanced beyond its starting position. Upon starting the motor the armature-circuit is closed through said coils L, and as the moving contact or arm K advances from its starting to its running position (the latter indicated in dotted lines in the drawing) said arm moves in contact with the contact-bar M and the contacts $j\ j'$, thereby changing the resistance or cutting out the resistance or series of coils L in series with the armature, thus accelerating the speed of the motor. When said moving contact K reaches the advance limit of its movement, as indicated in dotted lines in the figure of the drawing, the coils L are cut out of the circuit, the circuit being completed through the elongated contact $j'$, the moving contact, and the stationary contact-plate M to the return side of switch I.

The motor-magnet field and armature are connected in series through terminals of the controller G and receive current from conductor 20, that is connected with terminal C of the main-motor make-and-break switch. The series circuit of said armature and motor of the motor-magnet is traced through conductor F to controller-terminal F' at one side of the controller G, thence through bridging contact $g$ of controller-lever G' to controller-terminal A', thence through wire $A^2$ to motor-magnet armature B', thence through wire $A^3$ to controller-contact $A^4$, thence through bridging contact $g'$ of controller-lever G' to terminal contact $A^5$ of the controller, and thence through wire T to the negative side of switch I. In the present arrangement the terminal wire T constitutes the return for the motor-magnet circuit, as also to the return of the shunt field-circuit between the controlling-station and the motor. The elements of the controller embracing the terminals A' and $A^4$ are cross-connected on the opposite side of the central position of the controller-lever, thereby reversing the current through the motor-magnet armature when the controller-arm is thrown from one side to the other and operating the make-and-break and motor-reversing switches to reverse the main motor.

The operation of the parts thus far described are generally the same as the operation of the like parts shown in the prior United States patent, No. 622,430, before referred to, and need not be further herein described.

Referring now to the features of the apparatus herein shown embodying the novel features of my improvements, the same are made as follows: N designates as a whole the rheostat located at the motor, and O designates, as a whole, the rheostat located at the controlling-station and connected up in parallel with the motor-rheostat. The rheostat N comprises a plurality of contacts 21, 22, 23, 24, 25, 26, 27, 28, and 29, arranged in such relation to the contact-plate M and the series of plates J as to be wiped by the contact or arm K in its movement from its starting to its running position, and vice versa, the said arm conducting the current on the return side of the rheostat to the plate M and thence to the return side of switch I. The contact-plate 21 of the rheostat N is elongated, while the other contact-plates of said rheostat N are short and closely spaced and insulated from each other and the plate 21. The said plates 21 to 29, inclusive, constitute terminals of resistance-coils 30 and are in series with said coils. Resistance-coils of said rheostat N are all short-circuited in the starting position of the motor, but are cut into the shunt field-circuit upon the starting of the motor as the arm K sweeps from its starting position to its running position. The resistance is thus gradually introduced into the shunt-field and the field weakened, whereby the speed of the motor is increased to produce the various increments of increase within the limits of the motor-winding. The shorter terminals $j$ of the armature resistance are so disposed relatively to the terminals 22 to 29, inclusive, that the greater part of all the armature resistance is cut out before the resistance is introduced into the field. Thus the acceleration of the motor is effected gradually, due, first, to the strengthening of the armature-circuit as the contact K sweeps over the terminals or contacts $j$, and, second, to the weakening of the field as the contact sweeps over the terminals or contacts 22 to 29, inclusive.

The controller-rheostat comprises a plurality of contacts $21^a$, $22^a$, $23^a$, $24^a$, $25^a$, $26^a$, $27^a$, $28^a$, and $29^a$, that constitute the terminals of and are connected in series with the resistance-coils 34. The terminal $21^a$ is connected by terminal conductor S with the contact or terminal 29 of rheostat N, and said latter terminal is connected by conductor 35 with the terminal plate M and thence to the return side of the switch I.

S' is a terminal at the controller, which is associated with the terminals of coils 34 of rheostat O, and said terminal S' is connected by conductor T with the terminal 21 of rheostat N. The said terminal S' is connected severally with the terminals $21^a$, $22^a$, $23^a$, $24^a$, $25^a$, $26^a$, $27^a$, and $29^a$ of rheostat O by a bridging piece $g^2$, carried by the controller-arm G'. Two sets of terminals $21^a$ to $29^a$, inclusive, are employed, one located on each side of the swinging axis of the controller-arm G', and said terminals of the two sets are connected by cross-wires, as indicated by the dotted lines. Said coils 34 are therefore in circuit with the shunt and terminal conductors S and T, respectively, when the controller-arm is moved to either side of its central position.

The current directed to the shunt-field of the main motor-circuit is divided from that which passes to the armature-circuit at the terminal C' of the make-and-break switch. The shunt field-circuit is completed through conductor 32, field-coils A', conductor 33, to terminal 21 of the rheostat N at the motor. If it be assumed that the motor has just started and the moving contact or arm K is in its starting position and the controller-arm is on contact 21, the circuit will be completed through said moving arm, the plate M, to the return side of the switch I, whereby the field is at its greatest strength and passing the maximum current. When the arm K of the rheostat N is moved to its running position, as indicated in dotted lines, by the proper mechanism provided therefor, the resistance of the rheostat N is cut in the shunt field-circuit, and the path which the current tends to take, therefore, is from terminal plate 21, through the coils 30 to terminal 29, and thence through plate M to the return side of switch H. Whether or not any of the current takes this path depends upon the position of the controller-arm relative to the terminals of the controller-rheostat O—that is to say, if the controller-arm has not been moved into position to cut in any of the resistance of the coils 34 the current will pass from terminal plate 21 of rheostat N over conductor T, controller-terminal S', rheostat-terminal $21^a$ of rheostat O, and thence over conductor S to the return side of switch H. It will be observed, therefore, that the short circuit around the resistance is maintained when the moving contact of rheostat N is full over in its running position by the controller rheostat-arm and that said controller rheostat-arm always predetermines or introduces any amount of resistance desired to increase the speed of the motor and, conversely, determines the slowing-down speed of the motor by cutting the resistance out of circuit. The function of the automatic rheostat is that only of determining the rapidity of acceleration of the motor up to the speed which may be set by the operator and which may be varied at will by him through the controller rheostat-arm. It may be observed here that the speed of the moving contact or arm of the rheostat N is comparatively rapid, such speed being automatically controlled in any suitable manner from the mechanism of the engine—as, for instance, by the means shown in said prior patent, No. 622,430, hereinbefore referred to. By reason of the parallel relation of the two rheostats it will be observed that movement of the controlling rheostat-arm only and without movement of the automatic rheostat-arm will not accelerate the speed of the motor. If, for instance, the controller rheostat-arm be moved full over to cut in all the resistance thereof, the resistance of the rheostat N remains short-circuited until the arm K sweeps over the terminal plates of the coils 30 of said rheostat, and during such movement of the arm K the resistance is cut in gradually, with the result of a gradual acceleration of the motor.

It is desirable to provide means for automatically slowing down the motor at the terminals of movement of the part being driven thereby if for any reason the conductor or attendant should fail to properly operate the controller-arm for this purpose. It is for this purpose that the slowing-down and stopping device H is employed. Said device operates to short-circuit the coils of the rheostat N either singly or in groups, thereby operating to gradually reduce the speed of the motor. It comprises a main feed-terminal 37, connected by a conductor 38 with a terminal 29ᶜ adjacent thereto and with the terminal 29 of the rheostat N, and other terminals 25ᶜ, 23ᶜ, 22ᶜ, and 21ᶜ, insulated from the terminals 37 and 29ᶜ and connected by conductors 39, 40, 41, and 42, respectively, with the terminals 25, 23, 22, and 21 of rheostat N. Said terminal 37 is shown as circular, and the other terminals are arranged in concentric order therearound. The terminals 25ᶜ, 23ᶜ, 22ᶜ, and 21ᶜ are adapted to be brought into electrical connection with the feed-terminal 37 by a bridging piece 43, movable in a circular path in constant contact with terminal 37 and adapted for successive contact with the other terminals. The said bridging piece may be operated in any suitable manner (not shown) to pass in one direction of its movement in contact with the terminals and to be restored to its central position when out of contact with the terminals. Two sets of terminals are employed which are connected up by cross-wires, as shown, one designed to operate to slow down the car or other moving part at one terminal of its movement when the bridging piece or arm is swung to one side thereof and the other set to slow down the car at the other terminal when the bridge piece or arm is swung to the other side of its central or neutral position.

In the preceding description of the apparatus shown, to which my invention is applied, specific mention has been made to the motor as a shunt-wound motor, and it has been assumed to be a direct-current motor. It is to be understood, however, that the invention is capable of adaptation to motors of other types, and the particular description of the type referred to herein is not to be regarded as imposing limitations on the invention except as made the subject of specific claims.

I claim as my invention—

1. A speed-controlling apparatus for electric motors comprising two sets of resistances arranged in steps and connected in parallel in the controlling-circuit of the motor, and means associated with each set and independently operable for cutting in and short-circuiting said resistances for the purpose set forth.

2. A speed-controlling apparatus for electric motors comprising two rheostats connected in parallel in the controlling-circuit of the motor, the arm of one of which is automatically operated and manually-operable means for operating the arm of the other rheostat.

3. A speed-controlling apparatus for electric motors comprising two sets of resistances arranged in steps and connected in parallel in the controlling-circuit of the motor, one being located at the motor and the other at a distant controlling-station, means for automatically cutting in and short-circuiting the set of resistances at the motor, and a manually-operable device for cutting in and short-circuiting the controlling-station resistances.

4. A speed-controlling apparatus for electric motors comprising two rheostats connected in parallel in the controlling-circuit of the motor, one located at the motor and the other at a distant controlling-station, the moving arm of the motor-rheostat being automatically operated to accelerate the motor, and the arm of the controlling-station rheostat being manually operated.

5. A speed-controlling apparatus for shunt-wound electric motors comprising two rheostats connected in parallel in the shunt-field of the motor, the arm of one of which is automatically operated and manually-operable means for operating the arm of the other rheostat.

6. In an electric engine for elevators and the like, the combination with an electric motor, of means for regulating the speed of the motor comprising two rheostats, connected in parallel in the controlling-circuit of the motor, one located at the motor and adapted to be automatically operated thereby, and the other at the controller in the elevator-car, and means designed to be operated at the terminal landings of the car for successively short-circuiting the coils of the motor-rheostat to gradually decrease the speed of the motor.

7. The combination with an electric elevator-engine embracing an electric motor, a controller for said motor, a main switch and a reversing-switch arranged in the motor-circuit, and a motor-magnet for operating said switches embracing a field and armature connected in series through said controller, of a speed-controlling apparatus comprising two rheostats connected in parallel in the controlling-circuit of the motor, one located at the motor and the other at the controlling-station, said motor-magnet circuit being completed from the controller through the terminal conductor of the controller rheostat.

In testimony that I claim the foregoing as my invention I affix my signature, in the presence of two witnesses, this 10th day of November, A. D. 1906.

THADDEUS W. HEERMANS.

Witnesses:
W. L. HALL,
GEORGE R. WILKINS.